United States Patent Office 2,758,128
Patented Aug. 7, 1956

2,758,128

IRON CARBON MONOXIDE HYDROGENATION CATALYSTS

Walter Rottig, Oberhausen-Sterkrade-Nord, Karl Schenk, Oberhausen-Holten, and Herbert Spengler, Oberhausen-Sterkrade, Germany, assignors to Ruhrchemie Aktiengesellschaft, Oberhausen-Holten, Germany, and Lurgi Gesellschaft für Warmetechnik m. b. H., Frankfurt am Main-Heddernheim, Germany, German corporations No Drawing. Application October 7, 1952,
Serial No. 313,595

Claims priority, application Germany October 9, 1951

12 Claims. (Cl. 260—449.6)

This invention relates to improvements in iron carbon monoxide hydrogenation catalysts. It more particularly relates to a new catalyst for the hydrogenation of carbon monoxide for the production of a high yield of gasoline-like hydrocarbons.

It is well known that in the catalytic hydrogenation of carbon monoxide the type of catalyst used, method of production and the synthesis conditions are very critical in determining the yield types of hydrocarbons and oxygen-containing compounds produced. Thus by variations of the catalyst and synthesis conditions a great flexibility in the production of hydrocarbons and oxygen-containing compounds of various boiling ranges may be obtained. For chemical processing, the production of unsaturated hydrocarbons and oxygen-containing compounds is generally of particular importance. Due to their high prices, the production of paraffin-like hydrocarbons is also very desirable. Catalysts and synthesis conditions have been developed which will produce high yields of these compounds in the synthesis products from the catalytic hydrogenation of carbon monoxide.

In addition to the above mentioned compounds, due to the great consumption demand, there has always been a long felt need in the art for the cheap production of motor fuels by catalytic carbon monoxide hydrogenation. The compounds produced by the Fischer-Tropsch synthesis suitable for motor fuels are the gasoline-like hydrocarbons. Many proposals have been made for the high production of such low boiling gasoline-like hydrocarbons within the scope of the Fischer-Tropsch synthesis. With respect to such proposals, mention should be made, for example, of gas recycling.

One object of this invention is a catalyst for the hydrogenation of carbon monoxide producing a high yield of gasoline-like hydrocarbons boiling between approximately 30° and 180° C. and substantially including hydrocarbons having from 5 to 10 carbon atoms in the molecule. These gasoline-like hydrocarbons should be contained in the primary products of the process to an extent of more than 40% by weight and preferably of more than 50% by weight. This and still further objects will become apparent from the following description:

The catalyst in accordance with the invention is an iron catalyst which is carrier-free or contains only small amounts of as much as 20 parts of carrier material for every 100 parts of iron. The catalyst has a content of free alkali oxide of 0.5 to 2% calculated as $K_2O$, a $SiO_2$ content of 0.5 to 5%, and after reduction a free iron content of less than 50% and preferably of 20 to 30%. The reduced iron catalyst must have an inner surface of 110 to 180 square meters and preferably of 130 to 150 square meters per gram of iron. Catalysts may if necessary or desired contain activators such as copper, silver or metals of the 5th to 7th group of the periodic system in the conventional amounts.

The new catalysts may be used for the catalytic hydrogenation of carbon monoxide at temperatures of 170° to 300° C. and at pressures as high as 100 atmospheres. Pressures of 10 to 40 atmospheres are preferably used. The catalyst load should be 100 to 750 liters of fresh gas per liter of catalyst per hour. With the use of these synthesis conditions and the new catalyst, synthesis products are obtained which have a high content of the desirable low-boiling, gasoline-like hydrocarbons.

The inner surface of the catalyst in accordance with the invention is of decisive importance and must be as mentioned, 110 to 180 and preferably 130 to 150 square meters per gram of iron in the reduced catalyst. The determination of the inner surface area of the catalyst may be effected by the preparation of an absorption isotherm and its evaluation by the method of Brunauer, Emmet and Teller (the so-called BET-method). (See "Advances in Catalysis," vol. I, pages 65–89, Acad. Press Inc., Publishers, New York, 1948.)

The apparatus required for this determination substantially consists of a graduated buret in which the volume of gas to be absorbed (such as nitrogen or argon) is measured, a manometer for the determination of the gas pressure and a small flask in which the adsorbing substance to be tested is placed.

The new catalyst in accordance with the invention may be produced by precipitation of an iron salt solution and preferably of an iron nitrate solution. The precipitation should be effected with a pH value of 7 to 9 and preferably at a pH value of 7 to 8. In practice, the precipitation is effected in such a manner that the pH value is measured by means of pH paper or a glass electrode after the termination of the precipitation. The washing of the precipitated catalyst mass is effected with hot distilled water.

The $SiO_2$ content of the catalyst is conveniently adjusted by direct final impregnation of the precipitated and completely washed catalyst mass. This impregnation is effected in such a manner that the cold, moist catalyst mass is homogenized in a suitable commercial stirring apparatus by means of an aqueous solution of the salt to be used for the impregnation such as, for example, of potassium water glass.

The alkali content of the catalyst is generally adjusted by first washing the precipitated mass extensively and thereafter obtaining the desired silicic acid content by impregnation with commercial alkali silicate having a ratio of $K_2O$ to $SiO_2$ of 1 to 2.5. The silicic acid will remain quantitatively in the precipitated catalyst mass and may not be removed therefrom by any chemical expedient in the course of the catalyst production.

The catalyst is preferably adjusted to a $K_2O$ to $SiO_2$ ratio of 1:1 to 1:5. This will give particularly favorable results with respect to the lifetime and the activity of the catalyst.

If it is desirable to obtain a ratio of 1 to more than 2.5, the catalyst mass impregnated with water glass is neutralized with dilute nitric acid while maintaining a pH value of 6.5 to 8, thereby dissolving out a more or less large portion of the alkali and shifting the $K_2O$ to $SiO_2$ ratio in favor of the silicic acid.

If a $K_2O$ to $SiO_2$ ratio of 1 to less than 2.5 is desired, this may be effected by incompletely washing the precipitated catalyst mass and thus adjusting the residual alkali content to 1 to 2%. By the subsequent direct impregnation with commercial water glass, it is possible to obtain $K_2O$ to $SiO_2$ ratios which are lower than 1 to 2.5 such as, for example, 1 to 1.5 or even 1 to 1. The impregnation of the catalyst is possible not only with potassium silicate, but also with other alkali silicates while observing the alkali:SiO₂ ratio desired.

The desired content of free iron, i. e. less than 50%, preferably 20 to 30% of the total iron content, is obtained by a conventional reduction and by a control of the reduction conditions after having molded the catalyst mass in the conventional manner. Prior to molding, the catalyst mass should be dried for 15–30 hours at a temperature of 90° to 130° C., thereby adjusting a residual water content of 4–10% by weight and preferably of 5–7% by weight. The reduction may be effected with gases containing hydrogen and/or carbon monoxide at temperatures of 175°–320° C. and preferably at temperatures between 200 and 250° C. A high gas velocity of, for example, 1 to 2 meters per second and preferably of 1.2 to 1.5 meters per second calculated under standard conditions has been found to be advisable. All the percentage values given above are percentages by weight.

Except as set forth above, all the conditions for the catalyst preparation are the same as is conventional for the production of a precipitated iron catalyst. If all the conditions as set forth above for the production of the catalyst are observed, catalysts having the surface area desired of 110 to 180 square meters and preferably of 130 to 150 square meters per gram of iron in the reduced catalyst are necessarily obtained. In the same manner, any conventional mode of operation within the limits set forth above may be used for the carbon monoxide hydrogenation. The catalyst may be used in the carbon monoxide hydrogenation with the use of "fixed beds" as well as in the synthesis operated with the catalyst suspended in liquid media. However, the application of the catalyst prepared according to the invention in the "fluidized process" is not possible. The hydrogenation of carbon monoxide may be operated with all gases the CO:H₂ ratio of which is 1:0.5 to 1:2.

The following example is given by way of illustration and not of limitation.

*Example 1*

A solution containing 50 grams of iron, 2.5 grams of copper and 5 grams of lime in the form of their nitrates was precipitated in the hot state by adding it to a boiling soda solution in such a manner that the pH value after the precipitation was 8. Then the precipitated catalyst mass was washed to a residual alkali content of 0.3% calculated as K₂O and referred to total iron, and was thereafter impregnated with a 20% solution of potassium water glass having a K₂O to SiO₂ ratio of 1 to 2.6 so that the impregnated catalyst had a total K₂O content of 1.2% and an SiO₂ content of 2.3%, both referred to total iron.

The impregnated catalyst mass was dried at a temperature of 105° C. to a water content of 5%, crushed and sieved to a grain size of 2 to 4 millimeters. This catalyst was reduced for 60 minutes at a temperature of 225° C. using a gas mixture consisting of 75% H₂ and 25% N₂. Thereafter, it had a content of 30% of free iron. When this reduced catalyst mass was filled into a double tube of 4.5 m. length and operated with water gas at a synthesis pressure of 25 atmospheres, a temperature of 230° C., a gas load of 500 parts by volume of water gas per part by volume of catalyst per hour, and a recycle ratio of 1 to 3, a CO+H₂ conversion of 69% was obtained. The methane formation was 7%.

The liquid products were worked up by distillation resulting in a portion boiling above 320° C. of 18%.

We claim:
1. A substantially carrier free reduced iron catalyst for the hydrogenation of carbon monoxide with the production of a high yield of low boiling gasoline-like hydrocarbons having a free alkali oxide content of 0.5 to 2% calculated as K₂O, a SiO₂ content of 0.5 to 5%, a content of free iron of less than 50%, and an inner surface of 110 to 180 square meters per gram of iron.

2. Catalyst according to claim 1 in which said content of free iron is 20 to 30%.

3. Catalyst according to claim 1 in which said inner surface is 130 to 150 square meters per gram of iron.

4. Catalyst according to claim 1 in which the K₂O:SiO₂ ratio is about 1:1 to 1:5.

5. Process for the production of substantially carrier free iron catalyst which comprises precipitating an iron salt solution at a pH of about 7 to 9, washing the precipitate, impregnating the washed precipitate with alkali silicate, adjusting the free alkali oxide content to 0.5 to 2% calculated as K₂O and the SiO₂ content to 0.5 to 5%, thereafter reducing the catalyst to a free iron content of less than 50% and recovering a reduced iron catalyst having an inner surface of 110 to 180 square meters per gram of iron.

6. Process according to claim 5 in which the iron salt solution is precipitated at a pH of 7 to 8.

7. Process according to claim 5 in which the reduction is effected with a reduction gas containing a member selected from the group consisting of hydrogen and carbon monoxide at a temperature of about 175 to 320° C. and a gas velocity of 1 to 2 meters per second.

8. Process according to claim 5 in which the SiO₂ content of the catalyst is adjusted by subjecting the washed precipitate to a final impregnation with an alkali silicate.

9. In the method for the catalytic hydrogenation of carbon monoxide the improvement which comprises contacting a catalytic carbon monoxide hydrogenation synthesis gas with a substantially carrier free reduced iron catalyst having a content of free alkali oxide from 0.5 to 2% calculated as K₂O, a SiO₂ content of 0.5 to 5%, a free iron content of less than 50% and an inner surface of 110 to 180 square meters per gram of iron, at a temperature of 170 to 300° C. at a catalyst load of 100 to 750 liters of fresh synthesis gas per liter of catalyst per hour and recovering synthesis products having a high content of low boiling gasoline-like hydrocarbons.

10. Improvement according to claim 9 in which said contacting is effected at pressures of to 100 atmospheres.

11. Improvement according to claim 10 in which said contacting is effected at pressures of 10 to 40 atmospheres.

12. Catalyst according to claim 1 including an activator selected from the group consisting of copper, silver, metals of the 5th and metals of the 7th groups of the periodic system.

References Cited in the file of this patent

UNITED STATES PATENTS 2,617,774    Rottig et al.    Nov. 11, 1953

FOREIGN PATENTS 672,259    Great Britain    May 21, 1952